INVENTOR.
Henry B. DeVore
BY C. D. Tuska
ATTORNEY

June 6, 1950 H. B. DE VORE 2,510,687

BRIGHTNESS CONTROL FOR PULSE-ECHO POSITION INDICATOR SYSTEMS

Filed Nov. 17, 1944 2 Sheets-Sheet 2

INVENTOR.
Henry B. DeVore
BY C. D. Tuska
ATTORNEY

Patented June 6, 1950 2,510,687

UNITED STATES PATENT OFFICE 2,510,687

BRIGHTNESS CONTROL FOR PULSE ECHO POSITION INDICATOR SYSTEMS

Henry B. De Vore, Cranbury, N. J., assignor to Radio Corporation of America, a corporation of Delaware Application November 17, 1944, Serial No. 563,889

9 Claims. (Cl. 343—16)

My invention relates to systems employing pulse reflection for the production of a view or image and particularly to systems wherein objects or areas are scanned or "illuminated" by radio waves. By employing radio waves of the proper wave length, such as wave length of the order of 1 centimeter, for example, it is possible to obtain a view or picture of a region hidden by fog or darkness.

The object of the present invention is to provide a method of and means for obtaining an image or view of improved brightness in a system of the above-described character.

In one preferred embodiment of the invention radio pulses are radiated from a directive antenna that is oscillated rapidly through an arc in the horizontal plane and that is oscillated slowly at the same time through an arc in the vertical plane. Thus the beam of radio energy is made to scan the region to be viewed. The pulse rate is high compared with the horizontal scanning rate whereby sufficient pulses per scanning line are transmitted to give the desired picture detail.

The reflected radio pulses are applied to the control grid of a cathode ray tube having a phosphorescent screen upon which the picture image appears. In accordance with the present invention the reflected pulses after amplification are not applied directly to the control grid of the cathode ray tube but, instead, they are applied to a storage circuit which, in turn, applies them to the control grid. In this way a pulse of increased duration is applied to said control grid whereby the screen image is much brighter than it would be if the applied pulses were of the original short duration. As will be explained hereinafter, in one preferred embodiment, each reflected pulse of lengthened duration is terminated each time the next succeeding radio pulse is transmitted.

Figures 1, 3:
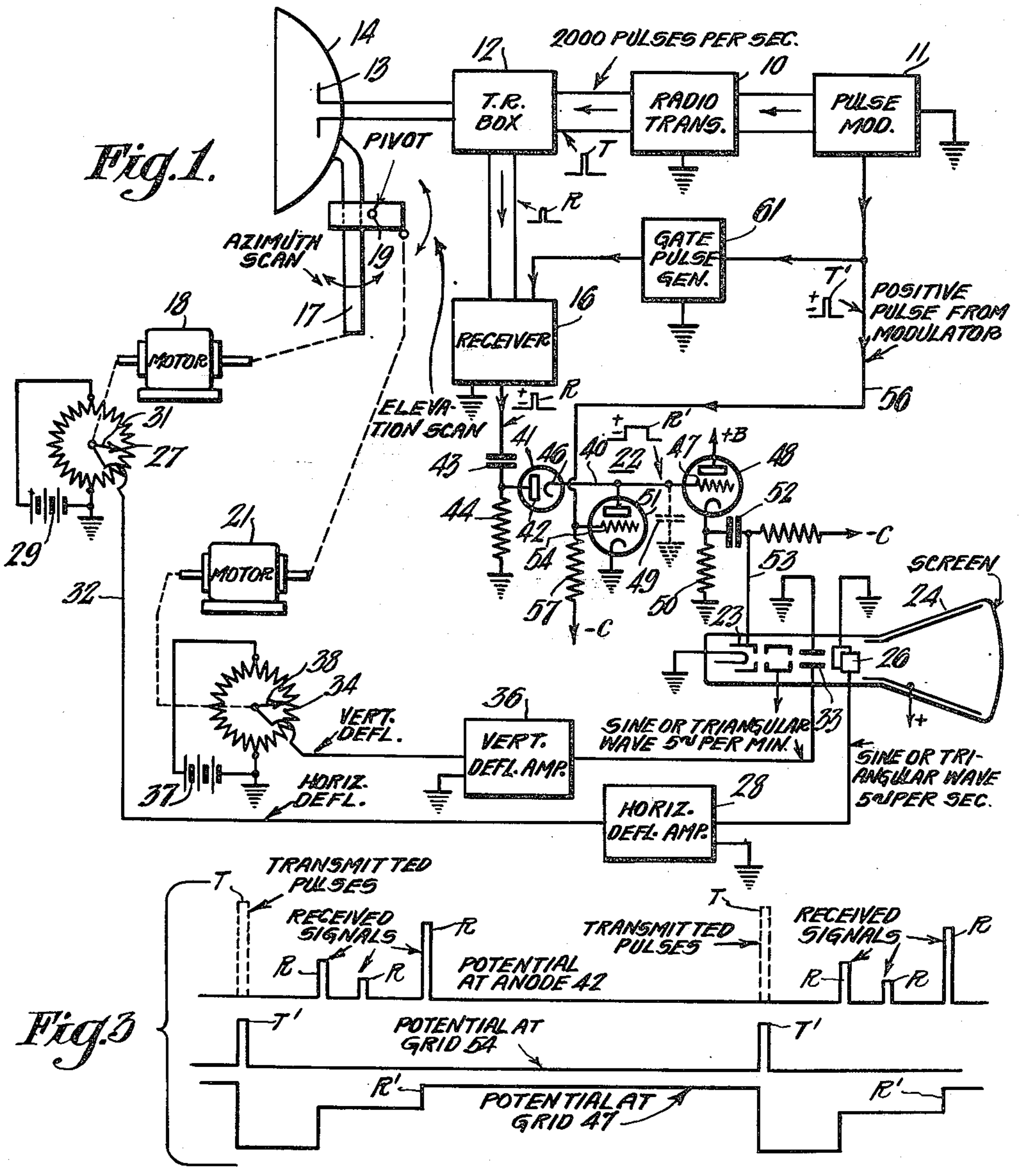
Figure 2:
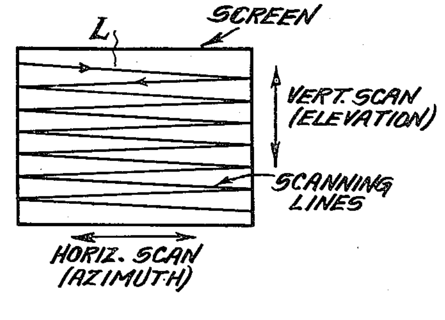
Figure 4:
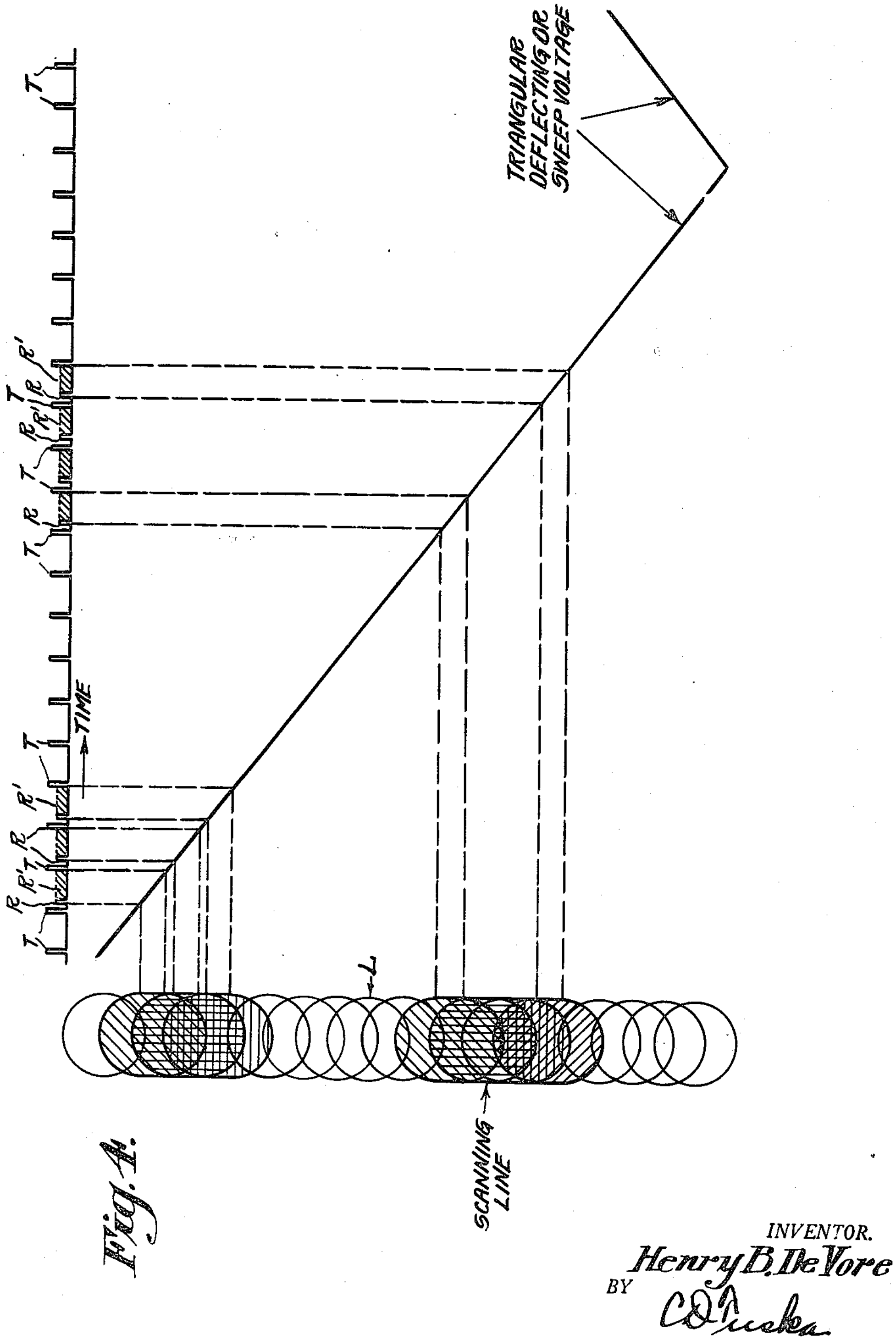

The invention will be better understood from the following description taken in connection with the accompanying drawing in which Figure 1 is a block and circuit diagram of one embodiment of the invention, Figure 2 is a view of the cathode ray tube screen showing the type of scanning employed, Figure 3 is a group of graphs that are referred to in explaining the operation of the system shown in Fig. 1, and Figure 4 is a diagram showing the relation between the radio pulses, the cathode ray deflection, and the scanning line trace of image. In the several figures, similar parts and similar voltage waves or signals are indicated by similar reference characters.

Referring to Fig. 1, the system comprises a radio transmitter 10 that is pulse modulated by a pulse modulator 11. The resulting radio pulses are applied through a transmit-receive or T-R box 12 to a directive antenna comprising a dipole 13 and a parabolic reflector 14. The reflected radio pulses picked up by the antenna 13 are supplied through the T-R box to a radio receiver 16 which demodulates and amplifies them. The T-R box 12 may be any one of several well known arrangements comprising spark gaps or vapor tubes for preventing direct pulse transmission to the receiver and for providing a low attenuation transmission path to the receiver for the reflected pulses. An arrangement of this general type is described in Girardeau Patent 1,035,958, dated August 20, 1912. A suitable T-R box is also described in Patent 2,412,315, issued December 10, 1946 to G. H. Brown.

The reflector 14 is suitably mounted so that it may be turned rapidly about a vertical axis 17 by a motor 18 for horizontal scanning and may be turned slowly about a horizontal axis 19 by a motor 21 for vertical scanning. The horizontal scanning preferably is through a small arc of about 30 to 40 degrees, for example, although it may be through a full 360°, if desired. Likewise, the vertical scanning preferably is through a small arc such as 30 to 40 degrees.

From the receiver 16 the reflected pulses are supplied through a pulse storage circuit 22 to the control electrode 23 of a cathode ray tube 24. Before describing the storage circuit 22, reference will be made to the means for deflecting the cathode ray in synchronism with the scanning by the antenna system 13—14.

For horizontal beam deflection a pair of deflecting plates 26 are supplied with a deflecting voltage that is obtained from a potentiometer 27 and amplified by an amplifier 28. In the example shown, the potentiometer resistor 27 has a battery 29 connected across it at diametrically opposite points, one of these points being grounded. A potentiometer arm 31 is rotated by the motor whereby a voltage of triangular waveform is supplied over a conductor 32 to the amplifier 28. The motor 18 drives the potentiometer arm 31 and the antenna 13—14 in such relation that the antenna swings from left to right as the arm 31 rotates 180 degrees between the high potential and low potential points of the resistor 27, and swings back from right to left as the arm 31 completes its 360 degree rotation.

Similarly, for vertical beam deflection a pair of vertical deflecting plates 33 are supplied with deflecting voltage that is obtained from a potentiometer 34 and amplified by an amplifier 36. A battery 37 is connected across the potentiometer resistor 34, and an arm 38 is rotated by the motor 21 in synchronism with vertical or up and down scanning of the antenna 13—14. The arm 38 is rotated 180 degrees from the high potential point on resistor 34 to its low potential point as the antenna swings through the scanning arc in one direction, and the arm 38 completes its 360 degree rotation while the antenna swings back through its scanning arc in the opposite direction. Thus, there is produced on the viewing screen of the tube 24 a scanning pattern of the character shown in Fig. 2, the top scanning line being indicated by the letter L. Fig. 2, however, shows fewer scanning lines than are employed in a preferred system.

Referring now to the storage circuit 22, it comprises a diode 41 having an anode 42 to which the received pulses are applied by way of a coupling capacitor 43 and an input resistor 44. The cathode 46 of diode 41 is directly connected through a lead 40 to the control grid 47 of a cathode follower tube 48. An output resistor 50 is included in the cathode circuit of the tube 48. As will be explained, the desired pulse storage is provided by the capacity indicated at 49. In practice a separate capacitor may not be required as ordinarily sufficient capacity to ground is provided by the grid-to-ground capacity of the tube 48, by the stray capacity of the lead 40 to ground, and by the anode-to-ground capacity of a vacuum tube 51 and by the cathode-to-ground capacity of the diode 41. The pulse output of the tube 48 is supplied from the resistor 50 to the control electrode 23 of the cathode ray tube through a coupling capacitor 52 and a lead 53.

It will be seen that a reflected pulse R of positive polarity will produce a pulse of current through the diode 41 which charges the capacity 49 substantially to the pulse voltage. This charge will remain on the capacity 49 until it is removed by the next modulating pulse T′ and the tube 51 as described hereinafter. As a result, the pulse R appears on the grid 47 as a comparatively long duration pulse R′ which is applied to the cathode ray control electrode 23. Because of the increased time the cathode ray causes the screen to phosphoresce, the picture appears many times brighter than when it is produced without using the storage circuit.

The tube 51 functions to discharge the capacity 49 to bring it to a predetermined potential, such as ground potential, periodically. The tube 51 is connected between the lead 40 and ground in the polarity required to remove a positive charge from the capacity 49 in response to a positive pulse being applied to the grid 54. Such pulses T′ are applied from the pulse modulator 11 over a conductor 56 to the grid 54. The tube 51 is held at anode current cut-off in the absence of a pulse from modulator 11 by a negative bias voltage applied through a resistor 57.

Fig. 3 illustrates the operation of the storage circuit 22. The times of transmission of the radio pulses are indicated by the dotted rectangles T. The modulating pulses are indicated at T′. The reflected pulses are indicated at R, the strongest of three reflections in the example assumed being at the more distant point.

The stored reflected pulse is shown at R′. It will be seen that the capacity 49 is charged to the potential of the first pulse R, that the second pulse R of smaller amplitude has no effect, and that the capacity 49 is charged to a higher potential by the third pulse R of the greatest amplitude. The important thing to note is that this charge on the capacity 49 (and the corresponding potential on the grid 47) lasts until the next modulating pulse T′ occurs. The positive pulse T′ on the grid 54 makes the tube 51 of low anode-cathode impedance and the capacity 49 is discharged therethrough. Thus, the circuit is reset and the action may be repeated.

The operation of the system is more fully illustrated in Fig. 4. Here it is assumed that, as the radio beam scans from left to right along one scanning line, three reflected pulses R are received near the left-hand side of the scanning arc and four reflected pulses R are received near the right-hand side of the scanning arc. The shaded areas between the pulses R and T indicate the periods that the pulses R are stored. In order to simplify the drawing, only 19 pulses per scanning line have been assumed.

At the left side of Fig. 4, there is represented the one scanning line L as it appears on the cathode ray tube screen. The successive cathode ray spot positions are indicated by the circles. It may be noted that the spot size usually is given a diameter about equal to the width between scanning lines. The intervals during which reflected pulses R cause the cathode ray to make the screen phosphoresce are indicated by shading of the spot positions. It will be apparent that the graphical construction employed is to project down from the pulses R and T to the deflecting voltage wave and then to project horizontally over to the scanning line distance axis.

From the foregoing description it will be apparent that by employing my invention the cathode ray tube screen is made to phosphoresce much longer than when no signal storage is provided, and that as a result the picture on the screen appears many times brighter. Also, it will be apparent that there is substantially no loss in picture detail as a result of employing the storage circuit.

It should be understood that the invention is not limited to the particular example described. For example, sine wave scanning is usually preferred where the entire antenna system is rotated or oscillated as shown in Fig. 1, but triangular wave scanning has been assumed in order to simplify the graphs in Fig. 4. The particular system design and the use of the system determine the pulse rate and scanning frequencies to be employed, the values indicated in Fig. 1 being given merely by way of example. The duration of a transmitted pulse may be of the order of 1 microsecond. Also, the invention is applicable to systems that transmit sound pulses rather than radio pulses as in the case of under water signalling.

According to another embodiment of the invention, the radio beam scanning system may be of the type described in application Serial No. 531,628, filed April 18, 1944 in the names of Harley Iams and Henry B. DeVore and entitled Radio vision devices. With this design, the horizontal scanning rate may be 30 per second and the vertical scanning rate ½ per second, giving a 60 line picture. The pulse rate with pulses of ½ microsecond duration may be 2000 pulses per second (this giving 500 microseconds between pulses), giving 33 picture elements per scanning line. In this example, the picture brightness as a result of employing signal storage is 900 times the brightness without storage if a pulse is reflected within the first 50 microseconds, i. e., with a 5 mile range. It will be understood that whatever the scanning rate, the material for the cathode ray tube screen is preferably selected to fluoresce or retain the image long enough so that a complete picture is seen on the screen at one time.

It may be desirable to provide "gating" for the receiver 16 so that only signal from objects within a certain distance region from the transmitter are shown on the cathode ray tube screen. Also, gating reduces the probability of spurious indications being produced by noise pulses. This may be accomplished by having the receiver 16 normally blocked or biased so as not to pass signal and by making it effective to pass signal while a gate pulse is applied thereto. The gate pulse may be supplied from a gate pulse generator 61 which delays and/or lengthens the modulator pulses T' to produce a gate pulse of the desired timing and duration.

I claim as my invention:

1. In combination, means for producing periodic pulses of electromagnetic energy, means for radiating said pulses toward a scene to be observed whereby said pulses are reflected as echoes, means for causing said pulses to scan said scene at a periodic rate in a direction corresponding to that of the scanning line in the reproduced view, the periodic rate of said pulses being high compared to said periodic rate of said scanning, means for receiving said echoes from said scene, means for producing a signal from said received echoes, a view reproducing means to which said signal is applied, means for maintaining said signal at substantially its peak value, and means synchronized with said radiated pulses to restore the signal to a predetermined level, said reproducing means including line scanning means that is synchronized with said scanning of said scene.

2. In combination, means for producing pulses of electromagnetic energy, means for radiating said pulses toward objects to be observed whereby said pulses are reflected as echoes, means for receiving said echoes from said objects, means for producing a signal from said received echoes, capacity storage means to which said signal is applied to hold said signal and thereby lengthen its duration, and means synchronized with said pulses to restore the signal on said storage means to a predetermined level.

3. In combination, means for producing periodic pulses of electromagnetic energy, means for scanning objects to be observed by said pulses at a rate that is slow compared with the periodic rate of said pulses, means for receiving said pulses after reflection from said objects, means for producing a signal from said received pulses, storage means for maintaining said signal at substantially its peak value, and means synchronized with said pulses to restore the signal to a predetermined level, and a view reproducing means to which said signal from the storage means is applied, said reproducing means including scanning means that is synchronized with said object scanning.

4. In combination, means for producing periodic electrical pulses, means for scanning objects to be observed by said pulses at a rate that is slow compared with the periodic rate of said pulses, means for receiving said pulses after reflection from said objects, means for producing a signal from said received pulses, capacity means for storing said signal, and means synchronized with said pulses to restore the signal on said capacity means to a predetermined level, a cathode ray tube to which said stored signals are applied for modulating the cathode ray, and means for deflecting the cathode ray in synchronism with said object scanning.

5. In a system wherein radio pulses are radiated toward and caused to scan objects to be viewed and wherein after reflection they are received as pulses each representative of an element of a view, a cathode ray tube having a control electrode and a phosphorescent screen, means for scanning said screen with the cathode ray in synchronism with the scanning of said view, means comprising a storage circuit for storing a reflected pulse, means for applying the reflected pulses to said control electrode through said storage circuit whereby the intensity of said cathode ray is increased for the duration of a stored reflected pulse, and means for discharging said storage circuit periodically and in synchronism with said radiated pulses to remove said stored pulse whereby the next reflected pulse may be stored.

6. In combination, means for producing radio pulses, means for radiating said pulses toward objects to be viewed which reflect said pulses, scanning means for obtaining point-to-point information from said reflected pulses representative of said objects, a viewing means comprising a screen and means for producing an illuminating beam therefor, means for scanning said screen with said beam in synchronism with the scanning by said scanning means, means for controlling the intensity of said beam, means comprising a storage circuit for storing a reflected pulse, means for applying the reflected pulses to said intensity control means through said storage circuit whereby the intensity of said beam is increased for the duration of a stored reflected pulse, and means for discharging said storage circuit periodically and in synchronism with said pulse radiation to remove said stored pulse whereby reflected pulses from objects illuminated by the next succeeding transmitted radio pulse may be stored.

7. In combination, means for producing electrical pulses, a radio transmitter, means for modulating said transmitter by said pulses, means for radiating the resulting radio pulses toward objects to be viewed which reflect said pulses, scanning means for obtaining point-to-point information from said reflected radio pulses representative of said objects, a cathode ray tube having a control electrode and a phosphorescent screen, means for scanning said screen with the cathode ray in synchronism with the scanning by said scanning means, means comprising a storage circuit for storing a reflected pulse, means for applying the reflected pulses to said control electrode through said storage circuit whereby the intensity of said cathode ray is increased for the duration of stored reflected pulse, and means for discharging said storage circuit to remove said stored pulse in response to the occurrence of the next succeeding modulating electrical pulse.

8. Apparatus comprising means for producing pulses of electromagnetic energy, means for radiating said pulses toward objects to be observed, means for receiving said pulses after reflection from said objects, means for producing a signal from each of said received pulses, means for maintaining the signal produced from a received pulse at substantially its peak value, and means for restoring said signal to a predetermined level in response to the occurrence of the next succeeding radiated pulse.

9. In combination, means for producing periodic radio pulses, means for radiating said pulses toward a scene to be observed whereby said pulses are reflected as echoes, means for causing said pulses to scan said scene at a periodic rate in a direction corresponding to that of the scanning line in the reproduced view, the periodic rate of said pulses being high compared to said periodic rate of said scanning, means for receiving said echoes from said scene, means for producing a signal from said received echoes, a view reproducing means to which said signal is applied, said last means comprising a cathode ray tube having a fluorescent screen on which said reproduced view appears, means for maintaining said signal at substantially its peak value, and means synchronized with said radiated pulses to restore the signal to a predetermined level at substantially the instant said radio pulses are radiated, said reproducing means including line scanning means that is synchronized with said scanning of said scene.

HENRY B. DE VORE.

REFERENCES CITED

The following references are of record in the file of this patent:

UNITED STATES PATENTS

| Number | Name | Date |
|---|---|---|
| 2,395,966 | Goldberg | Mar. 5, 1946 |
| 2,407,198 | Wolff | Sept. 3, 1946 |
| 2,409,448 | Rost et al. | Oct. 15, 1946 |
| 2,412,703 | Wolff | Dec. 17, 1946 |
| 2,415,566 | Rhea | Feb. 11, 1947 |
| 2,417,136 | Smith | Mar. 11, 1947 |
| 2,426,189 | Espenschied | Aug. 26, 1947 |

FOREIGN PATENTS

| Number | Country | Date |
|---|---|---|
| 497,147 | Great Britain | Dec. 9, 1938 |